United States Patent [19]

Morishita et al.

[11] Patent Number: 4,819,975

[45] Date of Patent: Apr. 11, 1989

[54] ENGINE STARTER MOTOR

[75] Inventors: Akira Morishita; Toshinori Tanaka, both of Hyogo, Japan

[73] Assignee: Mitsubishi Denki Kabushiki Kaisha, Tokyo, Japan

[21] Appl. No.: 179,810

[22] Filed: Apr. 11, 1988

[30] Foreign Application Priority Data

Apr. 22, 1987 [JP] Japan .............................. 62-61815[U]
Jun. 15, 1987 [JP] Japan ................................ 62-149445

[51] Int. Cl.⁴ ............................................. F02N 15/02
[52] U.S. Cl. .................................. 290/48; 290/38 R; 74/461; 74/7 E
[58] Field of Search ...................... 290/38 R, 48, 1 C; 74/7 E, 438, 461

[56] References Cited

U.S. PATENT DOCUMENTS 4,525,632  6/1985  Tanaka .............................. 290/38 R
4,703,670  11/1987  Kondo .............................. 74/461 X Primary Examiner—William M. Shoop, Jr.
Assistant Examiner—W. E. Duncanson, Jr.
Attorney, Agent, or Firm—Sughrue, Mion, Zinn, Macpeak and Seas

[57] ABSTRACT

An engine starter motor comprises a d.c. motor and a transmission device of high reduction ratio, the d.c. motor having an output shaft connected through the transmission device to an input shaft of an engine. The transmission device includes a wave generator connected to the output shaft of the d.c. motor, an internal gear 20; 48 formed integrally with a housing of the d.c. motor, and a flexible gear 21; 45 having an output shaft connected to the input shaft of the engine and meshing with the internal gear.

7 Claims, 3 Drawing Sheets

ENGINE STARTER MOTOR

BACKGROUND OF THE INVENTION

The present invention relates to a starter motor for an internal combustion engine and, particularly, to such motor which is compact and capable of providing a high reduction ratio.

FIG. 1 shows an example of a conventional d.c. starter motor, in cross section, which comprises an armature 1 including a core 1a composed of a lamination of electromagnetic steel plates and an armature coil 1b wound thereon, a rotary shaft 2 of the armature 1, a commutator 3 mounted behind the armature, a brush and holder assembly 4 fixedly secured to a rear bracket 6 by bolts 5, a bearing 7 fixed in a recess of the rear bracket 6 for supporting a rear end portion of the rotary shaft 2, a yoke 8 of the d.c. motor whose one end surface is fitted in the rear bracket 6, a permanent magnet 8a fixed on an inner peripheral surface of the yoke 8 for producing a magnetic field, and a flat gear 9 fixedly mounted on a front portion of the rotary shaft 2 and meshed with planet gears ( not shown ) of a planet reduction gear mechanism having a low reduction ratio. An output of the planet reduction gear mechanism is transmitted through an overrunning clutch ( not shown ) to a pinion ( not shown ). The rotation of the pinion is transmitted through a ring gear formed on a periphery of a fly-wheel fixedly mounted on a crank shaft of an engine to start the latter.

In such conventional starter motor, it is possible to obtain a necessary torque directly. However, due to the use of the lamination core 1a and because the temperature of the armature 1 increases in proportion 1 ( power consumption of the armature coil 1b)/(volume of the motor ), the power consumption of the armature coil 1b becomes considerable and substantial heat is generated thereby when the number of turns of the coil 1b and hence the resistance thereof is large. In order to protect the armature coil 1b from the thermal breakdown of its insulation, it is necessary to make the motor large and complicated in structure, which makes the motor expensive and provides a larger possibility of malfunction of commutator 3.

Further, due to the use of the transmission path of rotational force which includes the pinion and the ring gear, the location of the starter motor with respect to the engine is limited. Further, in order to increase the reduction ratio, it is necessary to make the ring gear on the fly-wheel large, leading a large transmission mechanism. Alternatively, it may be possible to reduce the number of teeth of the pinion. However, since the maximum reduction ratio is 120/8=15 at present, it is necessary to provide another reduction device for a reduction ratio larger than 15.

SUMMARY OF THE INVENTION

An object of the present invention is to provide a starter motor for an engine which is a combination of a single pole d.c. motor and a transmission device having a high reduction ratio.

Another object of the present invention is to provide such starter motor having a freedom of mounting location with respect to the engine.

According to the present invention, the above objects are achieved by a use of a harmonic transmission device of high reduction ratio having an input shaft which is directly connected to a rotary shaft of a d.c. motor. According to the present invention, the necessity of the ring gear in transmitting rotational force of the motor to the crank shaft of the engine is eliminated while achieving a high reduction ratio by the harmonic transmission device.

DETAILED DESCRIPTION OF THE PREFERRED EMBODIMENTS

Figure 2:
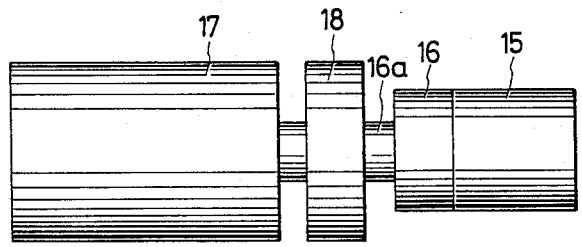
FIG. 2 shows a rotational force transmission arrangement between an engine and a starter motor according to the present invention, schematically.

In FIG. 2 which shows a connecting mechanism between a d.c. starter motor 15 and an engine 17, a transmission device 16 of high reduction ratio is provided therebetween. An input shaft of the transmission device 16 is directly connected to a rotary shaft of the d.c. motor as to be described later. An output shaft 16a of the transmission device 16 is connected through a fly-wheel 18 to a crank shaft of the engine 17.

Figure 1:
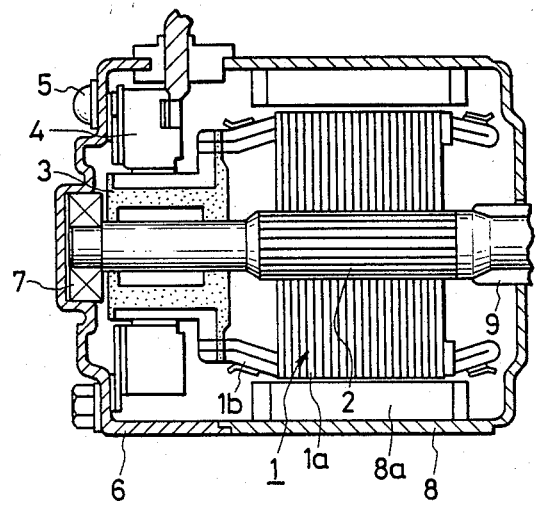
FIG. 1 is a cross section of an example of a conventional starter motor.
Figure 3:
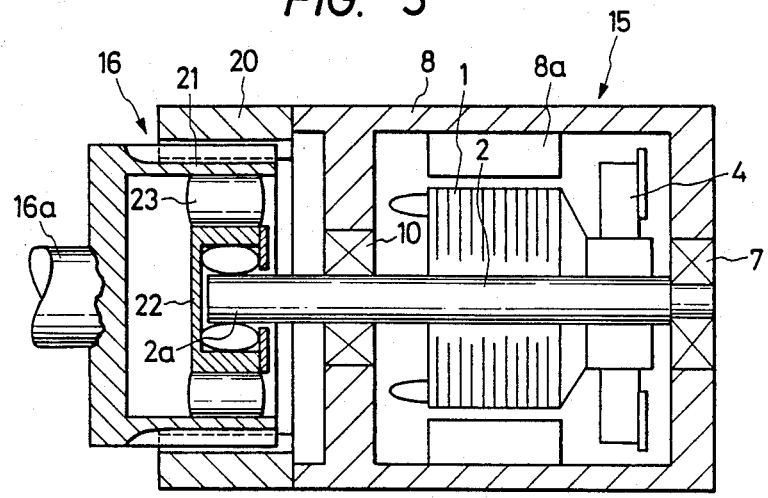
FIG. 3 is a cross section of an embodiment of the present starter motor.

FIG. 3 is a cross section of the motor 15 and the transmission device 16 shown in FIG. 2. In FIG. 3, the starter motor 15 is composed of an armature shaft 2 supported by bearings 7 and 10 which are supported by a housing 8, an armature 1 which rotates together with the rotary shaft 2, a permanent magnet 8a fixed to an inner wall of the housing 8 for producing a magnetic field in a region where the armature 1 exists, and a commutator 4, as in the case of the conventional starter motor shown in FIG. 1. The transmission device 16 is composed of an internal ring gear 20, a flexible outer gear 21 which meshes with the internal ring gear 20, and a one-way clutch 22 mounted on the shaft end 2a to form a one-way connection between the rotary shaft 2 and the outer gear 21 through rollers 23 having different diameters.

The flexible outer gear 21 has teeth the number of which is smaller than that of the internal ring gear 20, and a pitch circle smaller than that of the gear 20. The rollers 23 inscribed within the flexible outer gear 21 are arranged such that they deform the flexible gear 21 supported thereby to cause the latter to have an ellipsoidal cross section to thereby mesh with portions of the ring gear 20 corresponding to opposite end points of a major axis of the ellipse. That is, when the rollers 23 rotate, together with the output shaft 2 of the motor 15, in a clockwise direction, the flexible outer gear 21 rotates in a counterclockwise direction at a lower speed while meshing points thereof with the ring gear 20 are moving successively and, when the rollers 23 orbit one along the flexible outer gear 21, the flexible outer gear 21 rotates by an angle corresponding to the difference in the number of teeth between the two gears. Therefore, the speed ratio between the rollers 23 and the flexible outer gear 21 becomes:

$$Vo/Vi = (Nf - Nr)/Nf \text{ with } (Nr > Nf),$$

where Vo is an output speed (rpm), Vi is an input speed (rpm), Nr is the number of teeth of the internal ring gear 20 and Nf is the number of teeth of the flexible outer gear 21. Assuming, for example Nr=180 and Nf=178, the speed ratio becomes;

$$Vo/Vi = (178 - 180)/178 = -1/89.$$

The rotation of the armature shaft 2 is the considerably reduced and transmitted by the transmission device 16 to the output shaft 16a.

Figure 4:
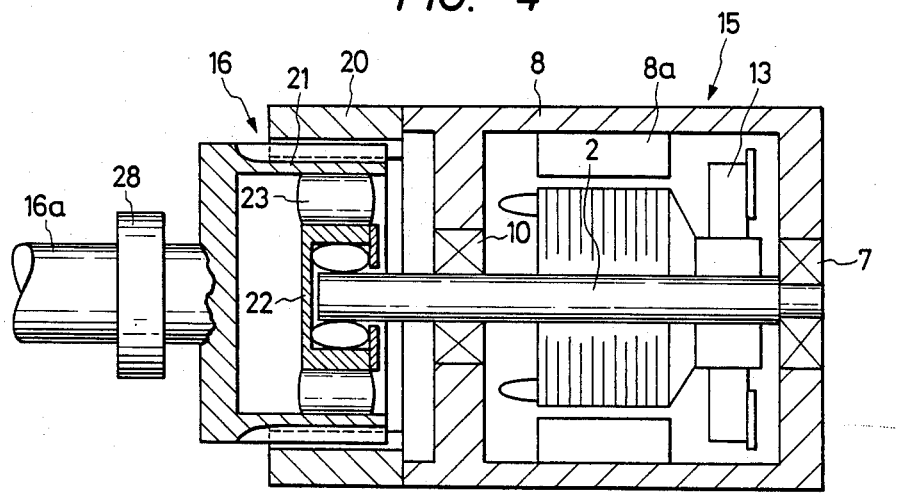
FIG. 4 is a cross section of another embodiment of the present starter which includes an electromagnetic clutch.

It may be possible to rotate the rollers 23 by the rotational output of the armature shaft 2, directly, although it is preferrable to transmit the rotation of the armature shaft 2 in only one direction through the one-way clutch 22 to the rollers 23 while preventing rotation of the armature shaft 2 in the opposite direction from being transmitted to the rolls by a crunching. Further, it is possible to provide an electromagnetic clutch 28 between the output shaft of the transmission device 16 and the pinion so that the connection between the transmission system and the engine is interrupted when the starter motor is not operated, as shown in FIG. 4. In the latter case, an additional protection for the motor is achieved.

Figure 5:
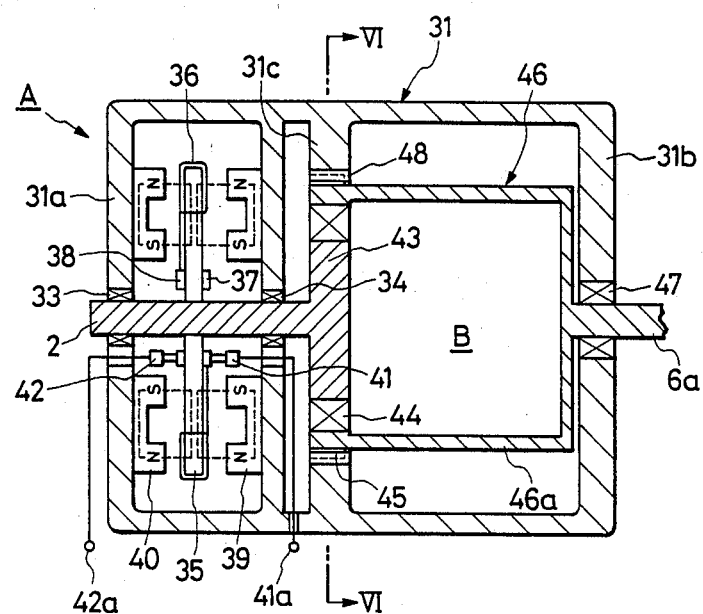
FIG. 5 is a cross section of another embodiment of the present invention.

FIG. 5 shows another embodiment of the present starter motor in cross section. In FIG. 5, the starter motor comprises a motor section A and a transmission section B which are housed in a space defined between an end wall 31a and a partition wall 31c of a cylindrical housing 31, and a space defined between the partition wall 31c and another end wall 31b of the housing, respectively. The motor section A comprises a single pole d.c. motor composed of a rotary shaft 2 supported by bearings 33 and 34 provided in the walls 31a and 31c, respectively, a rotor disc 35 of magnetic material fixedly mounted on an intermediate portion of the rotary shaft 2, a coil 36 mounted radially on a peripheral portion of the rotor disc 35, slip rings 37 and 38 arranged coaxially around center portions on opposite surfaces of the rotor disc 35 and connected to opposite ends of the coil 36, respectively, annular permanent magnets 39 and 40, each having a generally U shaped cross section, fixedly secured to the end wall 31a and the partition wall 31c of the housing 31 in opposing relation to each other through the rotor disc 35, respectively, and brushes 41 and 42 connected to the slip rings 37 and 38, respectively.

The transmission section B is composed of an ellipsoidal cam member 43 connected directly to an end of an extension of the rotor shaft 2 protruding from the bearing 34, rollers 44, a flexible gear 45 having teeth on an outer surface thereof, and a ring gear 48 formed in an inner periphery of an opening defined in a wall of the housing 31 between the partition wall 31c and the wall 31b thereof. The flexible gear 45 is connected to the output shaft 6a supported by a bearing 47 supported by the end wall 31b through a cylindrical flexible member 46.

Figure 6:
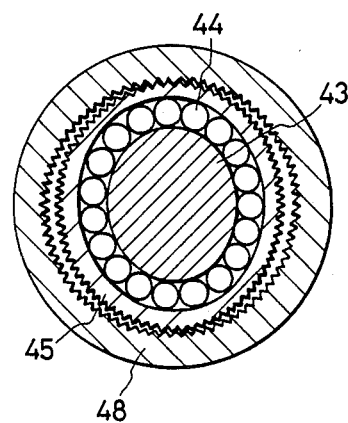
FIG. 6 is a cross section taken along a line VI-VI in FIG. 5.

FIG. 6 is a cross section taken along a line VI—VI in FIG. 5. In FIG. 6, the flexible gear 45 is supported by the ellipsoidal cam member 5 through the rollers 44 so that the flexible gear 45 is shaped to accomodate the ellipse of the cam member 43, opposite end portions of a major axis of the elipe of the flexible gear 45 mesh with corresponding portions of the ring gear 48 and the meshing points are rotated successively with rotation of the cam member 43. A relative rotation of the flexible gear 45 with respect to the ring gear 48 is transmitted through the flexible cylinder portion 46 to the output shaft 6a. The reduction ratio of this transmission section is determined in the same way as mentioned with respect to the preceding embodiment.

In operation, when a d.c. power is supplied between terminals 41a and 42a connected to the brushes 41 and 42, respectively, a d.c. current flows through the coil 36. Since the permanent magnets 39 and 40 provided a magnetic field which penerates the rotor disc 35, the latter is subjected to a rotational force and rotated at high speed. The rotational force of the rotor disc 35 is transmitted through the rotary shaft 2 to the ellipsoidal cam member 43 to cause the latter to rotate within the rollers 44. With the rotation of the ellipsoidal cam member 43, the flexible gear 45 is deformed correspondingly and thus the meshing points of the ring gear 48 with the opposite end points of the major axis of the ellipse described by the flexible gear 45 supported by the ellipsoidal cam member 43 through the rollers 44 are shifted in the same direction, successively, in the same way as mentioned with respect to the previous embodiment. Thus, the flexible gear 45 is rotated in the opposite direction to the rotational direction of the elipsoidal cam member 43. The rotation of the flexible gear 45 is transmitted through the flexible cylinder member 46 to the output shaft 6a connected thereto.

It should be noted that the single pole d.c. motor to be used is not limited to that shown in FIG. 5 and any other motor having other construction may be used in the present invention. Further, the transmission device shown and described may be replaced any other device so long as it has a high reduction ratio while being deformed. An example of such device may be a wave generator comprising a link having a roller at each end thereof or a planet gear system.

As mentioned hereinbefore, according to the present invention in which an output shaft of a starter motor is directly connected to an input shaft of an engine through a transmission device having a high reduction ratio, the freedom of mounting the starter motor on the engine is improved and the starter motor itself can be made compact due to the exclusion of a conventional ring gear of a large size fly-wheel. When the reduction ratio desired is, for example, 50 to 100, the reduction device included in the starter motor may be more simpler in construction.

When the motor is a single pole d.c. motor whose heat generation is relatively small and whose commutation is hardly degraded, the construction of the starter motor can be made much simpler and more compact.

What is claimed is:

1. An engine starter motor, comprising: a d.c. motor, and a transmission device of high reduction ratio, said d.c. motor having an output shaft connected through said transmission device to an input shaft of an engine (17), said transmission device including a wave generator connected to said output shaft of said d.c. motor, an internal gear (48) formed integrally with a housing (31) of said d.c. motor, and a flexible gear (45) having an output shaft connected to said input shaft of said engine and meshing with said internal gear, wherein said wave generator includes an ellipsoidal cam member (43) fixedly mounted on said output shaft of said d.c. motor, and said flexible gear is supported by said ellipsoidal cam member through rollers (44).

2. An engine starter motor, comprising: a d.c. motor, and a transmission device of high reduction ratio, said d.c. motor having an output shaft connected through said transmission device to an input shaft of an engine (17), said transmission device including a wave generator connected to said output shaft of said d.c. motor, an internal gear (20) formed integrally with a housing (8) of said d.c. motor, and a flexible gear (21) having an output shaft connected to said input shaft of said engine and meshing with said internal gear, wherein said wave generator includes a plurality of rollers (23) having different diameters and arranged on said output shaft of said d.c. motor such that said flexible gear is supported thereby and deformed to an ellipse.

3. The engine starter motor as claimed in claim 2, wherein said rollers are arranged on said output shaft directly.

4. The engine starter motor as claimed in claim 2, wherein said rollers are arranged on said output shaft of said d.c. motor through a one-way clutch 22.

5. The engine starter motor as claimed in claim 3 or 4, further comprising an electromagnetic clutch provided between said output shaft of said flexible gear and said input shaft of said engine.

6. The engine starter as claimed in any of claims 1, 3, 4 or 2, wherein said d.c. motor is a single pole d.c. motor.

7. The engine starter motor as claimed in claim 5, wherein said d.c. motor is a single pole d.c. motor.

* * * * *